(No Model.) 4 Sheets—Sheet 1.
H. J. DOUGHTY.
METHOD OF AND APPARATUS FOR MAKING PNEUMATIC TIRES.
No. 567,457. Patented Sept. 8, 1896.
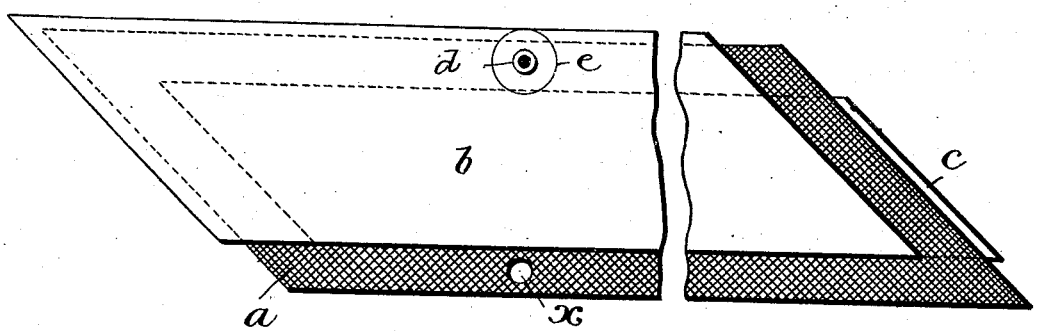
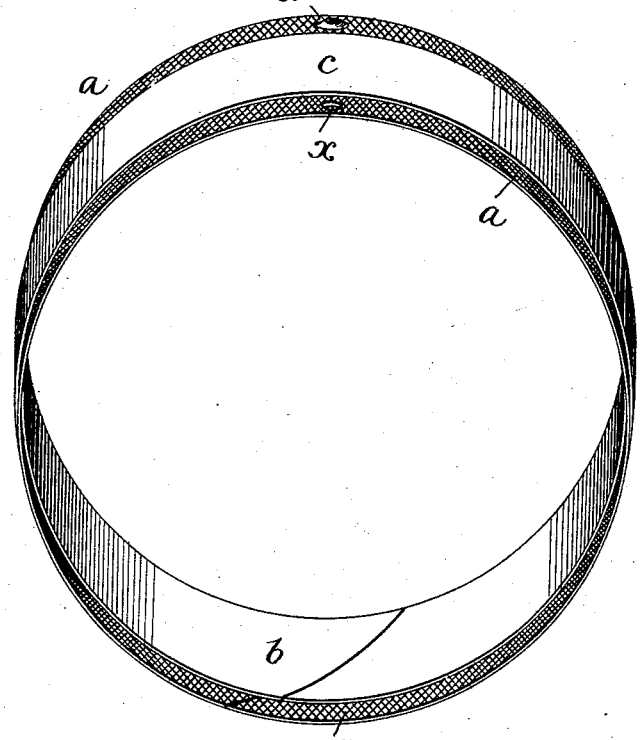

(No Model.) 4 Sheets—Sheet 2.

H. J. DOUGHTY.
METHOD OF AND APPARATUS FOR MAKING PNEUMATIC TIRES.

No. 567,457. Patented Sept. 8, 1896.

(No Model.)  4 Sheets—Sheet 4.

H. J. DOUGHTY.
METHOD OF AND APPARATUS FOR MAKING PNEUMATIC TIRES.

No. 567,457. Patented Sept. 8, 1896.

UNITED STATES PATENT OFFICE.

HENRY J. DOUGHTY, OF PROVIDENCE, RHODE ISLAND.

METHOD OF AND APPARATUS FOR MAKING PNEUMATIC TIRES.

SPECIFICATION forming part of Letters Patent No. 567,457, dated September 8, 1896.

Application filed January 3, 1896. Serial No. 574,234. (No model.)

*To all whom it may concern:*

Be it known that I, HENRY J. DOUGHTY, a citizen of the United States, residing at Providence, in the county of Providence and State of Rhode Island, have invented certain new and useful Improvements in Methods of and Apparatus for Making Pneumatic Tires, of which the following is a specification.

My invention is an improved method of and apparatus for making tires, as fully set forth hereinafter, and illustrated in the accompanying drawings, in which—

Figure 3:
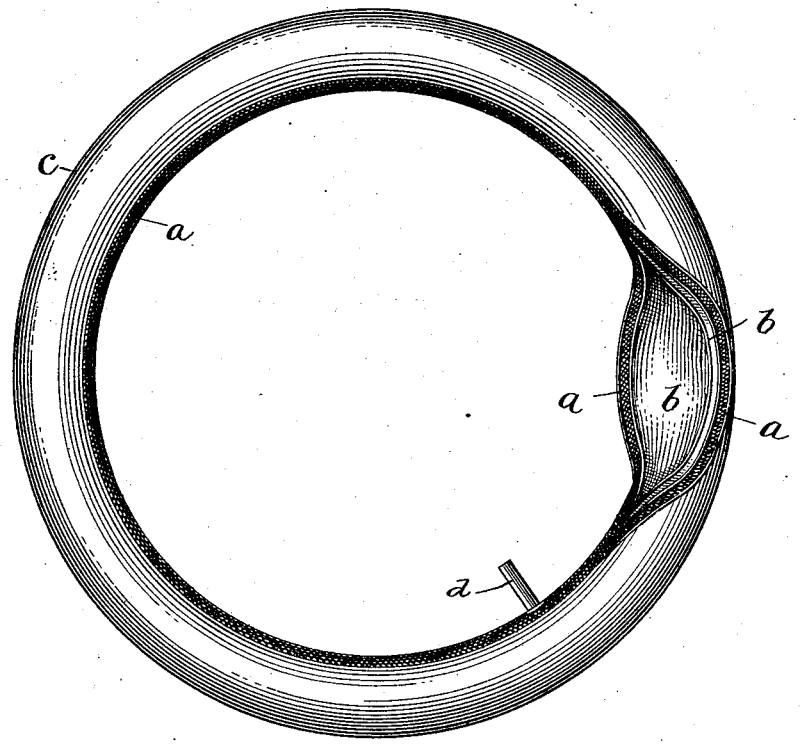
Figure 4:
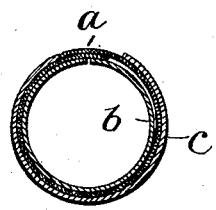
Figure 5:
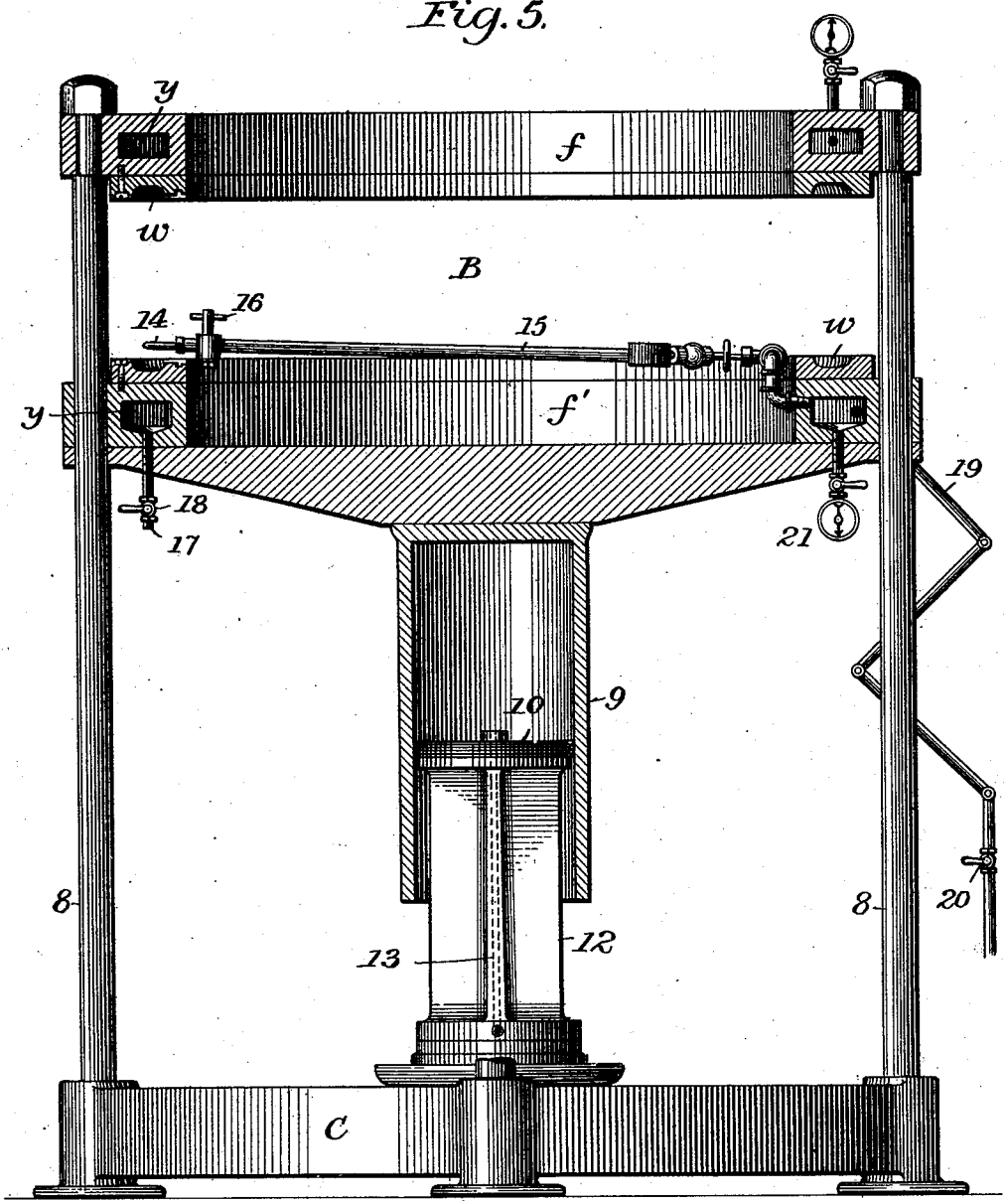
Figure 6:
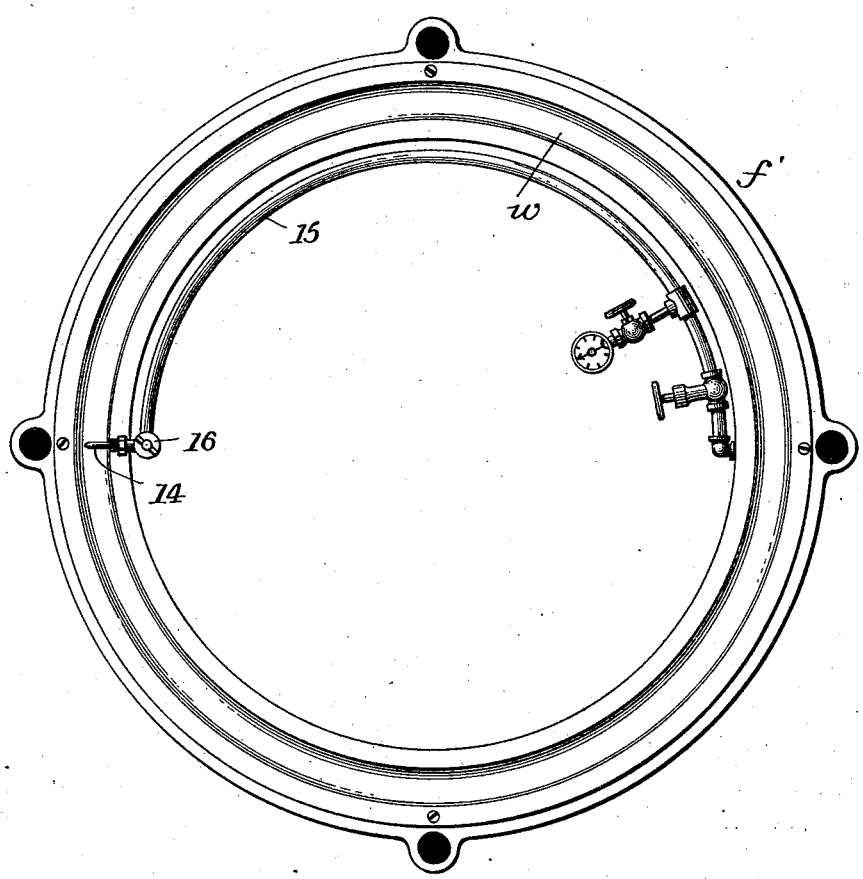

Figure 1 is a plan view illustrating the arrangement of rubber and fabric strips in the manufacture of the tire. Figs. 2 and 3 are perspective views illustrating the progressive formation of the strips into a tube. Fig. 4 is a transverse section of the tire. Fig. 5 is a sectional elevation of the apparatus for vulcanizing the tire. Fig. 6 is a plan of the lower mold-section.

The tire is composed of a compound fabric comprising an inner lining of rubber, a covering of woven fabric outside of the rubber, and a facing of rubber outside the woven fabric.

In making the tire I dispense with the use of formers and take a strip of woven fabric $a$, somewhat longer than the circumference of the tire to be formed and also somewhat wider, and upon one side of the strip $a$ I lay a strip $b$, of rubber, shorter and narrower than the strip $a$, and upon the opposite side of the strip $a$ I lay a narrow strip $c$, of rubber. These parts are so disposed that the strip $a$ will project beyond the strip $b$ to a considerable extent at one end and at one side, the strip $b$ projecting slightly beyond the opposite side and end of the strip $a$, while the strip $c$ lies along the central portion of the strip $a$, which projects beyond it at both sides to a considerable extent and also at one end, as shown in Fig. 1.

While the parts are in the position shown in Fig. 1, I punch an opening through the strips $b$ $a$ for the passage of an air-tube $d$, the flange $e$ of said tube bearing on the face of the strip $b$, and in the strip $a$ at the opposite edge I punch a hole $x$, which will receive the tube $d$ when the compound fabric is folded over to bring the side edges together.

The ends of the compound strip are first brought together to form a ring, as shown in Fig. 2, the edges of the strip $b$ meeting and the joint being overlapped by the projecting end of the strip $a$ and the ends of the strip $c$ being brought together and cemented. After this the edges of the compound strip are brought together and cemented at one point, and this operation is continued, as illustrated in Fig 3, until the complete tube is formed, the parts in transverse section occupying the position shown in Fig. 4.

While, as before stated, the compound tube may be vulcanized in any suitable manner, I prefer to vulcanize it in a mold within which the tube is inflated by pressure of steam admitted to the interior to heat and vulcanize the lining from the inside, while the mold is also heated to simultaneously heat and vulcanize the outside or rubber cover. To secure effective results and form a tire which is not weakened by being overheated or overvulcanized, on the one hand, or only partially vulcanized, on the other, I provide means whereby internal and external heat may be regulated and whereby the heating may be at once discontinued upon the proper effect being produced. By this means I am able to reduce the time of vulcanization from one hour or more to less than fifteen minutes, while securing much more uniform results and tires of a more durable character.

Different apparatus may be employed for carrying out this process of manufacture; but I prefer that which I will now describe and which is illustrated in Figs. 5 and 6. In said figures the vulcanizing-mold B consists of two separable sections $f f'$, each having a chamber $y$ for the reception of steam and an annular groove $w$, the two grooves $w$, when the sections are brought together, constituting the annular chamber in which the tire is molded and vulcanized. For this purpose the groove $w$ may be of any desired shape, and in order to facilitate repairs, as well as adapt the apparatus to molding different forms and sizes, the sections of the mold which contain the grooves $w$ $w$ may be detachable from the other sections $f f'$, which have the steam-chamber $y$ in them. As shown, the upper section $f$ of the mold is secured immovable from the frame C, which consists of a base and vertical rods 8, to which latter the section $f$ is bolted. The section $f'$ slides upon the rods 8 as guides and may be raised or lowered by levers, screws, or otherwise, but preferably by a hydraulic engine consisting of a cylinder 9, secured to the section $f'$, and a piston 10 upon a standard 12, the operating fluid being admitted to and discharged through a suitable channel 13.

With the mold is combined an injector or inflating pipe 14, which is adapted to enter the air-tube $d$ after the tire has been placed in the lower groove $w$, and with this injector-pipe communicates any suitable source of steam or hot-air supply, the steam or hot air being admitted to the injector-pipe after the two sections of the mold have been brought together. As shown in Fig. 5, a pipe 15 is attached to the steam-chamber $y$ at the opposite side from where the injector-pipe 14 is attached to the lower mold-section. This pipe 15 serves to conduct steam from the vulcanizing-chamber through the tube $d$ into the tire, and the said pipe 15 is supplied with valves to regulate the pressure within the tire and with a pressure-gage.

Steam may be admitted to the chambers $y$ of the lower section $f'$ from any suitable source in any suitable manner and so as to vary the pressure and the temperature. One means of securing these results consists in providing the chamber with a discharge-pipe 17 and cock 18 and admitting the steam through a steam-pipe 19, preferably jointed and provided with a cock 20. A pressure-gage 21 also communicates with the chamber $y$ of the lower mold-section. By closing the cock 18 and admitting a limited amount of steam to the chamber $y$ a low pressure and temperature may be obtained, which may be increased by further opening the cock 20, while a still higher temperature may be effected by opening the cock 18 and allowing the steam to pass rapidly through the chamber. By turning the cock 16 the passage of steam to the interior of the tire-tube may be regulated.

By properly adjusting the various cocks the pressure within the tire-tube may be regulated at will and the temperature uniformly raised or lowered, so as to quickly vulcanize the tube throughout its entire extent.

Without limiting myself to the precise construction and arrangement of parts shown and described, I claim as my invention—

1. The within-described improvement in the manufacture of pneumatic tires, the same consisting in placing a narrow strip of rubber upon one side of a strip of woven fabric, and a wider strip of rubber but not so wide as the textile fabric upon the opposite side of the latter bringing the ends of the compound strips together to form a ring, and then bringing the edges of successive portions together to form a tube and thereafter vulcanizing the tube, substantially as set forth.

2. The within-described improvement in the art of making pneumatic tires the same consisting in first forming a cylinder or ring by bringing together the ends of superposed strips of unvulcanized rubber and fabric, then progressively bringing together and securing the opposite edges of the ring to form a tube and then vulcanizing the rubber, substantially as described.

3. In the manufacture of pneumatic tires, first bringing together the ends of superposed strips of fabric and vulcanizable rubber, then folding and bringing together the edges of said strips, and then vulcanizing the rubber by heating the same both externally and internally to form a continuous tube, substantially as described.

4. In an apparatus for vulcanizing pneumatic tires, the combination of a mold adapted to receive an expanded tube, and comprising a stationary and a movable hollow section, means for supplying said sections with an expansive heating fluid, and a pipe connected with said movable section for supplying suitable quantities of said fluid to the interior of the inclosed tube, substantially as shown and described.

5. In an apparatus for vulcanizing pneumatic tires, the combination of a mold adapted to receive an expanded tube, and comprising a stationary and a movable hollow section, means for supplying said sections with an expansive heating fluid, and means for simultaneously supplying the interior of the tube with the same fluid from the interior of the said movable section, substantially as described.

6. In an apparatus for vulcanizing pneumatic tires, the combination of a mold adapted to receive an expanded tube and comprising a stationary and a movable continuous hollow chamber each provided with a detachable mold-section, means for supplying said chambers with an expansive heating fluid, and means connected with one of said chambers for supplying suitable quantities of said fluid to the interior of the inclosed tube, substantially as described.

7. In an apparatus for vulcanizing pneumatic tires, the combination of a stationary and a movable chamber each of a circular or ring shape, correspondingly-formed detachable mold-sections carried by the adjacent faces of said chambers, and adapted between them to inclose an expanded tube, means for supplying said sections with an expansive heating fluid, and means for simultaneously supplying the inclosed tube with fluid from the interior of the said movable section, substantially as described.

In testimony whereof I have signed my name to this specification in the presence of two subscribing witnesses.

HENRY J. DOUGHTY.

Witnesses:
ROBERT L. WALKER,
H. FRANK PAYTON.